June 23, 1970    H. SCHMITT    3,516,750
ELECTRONIC EXPOSURE METER USING TWO INDICATOR ELEMENTS
Filed Jan. 2, 1968

INVENTOR:
HELMUT SCHMITT
By: Wolk and Wolte
ATTORNEYS

United States Patent Office 3,516,750
Patented June 23, 1970

3,516,750
ELECTRONIC EXPOSURE METER USING TWO
INDICATOR ELEMENTS
Helmut Schmitt, Wunderburg, Germany, assignor to
P. Gossen & Co. G.m.b.H., Erlangen, Germany
Filed Jan. 2, 1968, Ser. No. 695,037
Claims priority, application Germany, June 6, 1967,
G 50,278
Int. Cl. G01j 1/42, 1/44
U.S. Cl. 356—224                                4 Claims

ABSTRACT OF THE DISCLOSURE

In an exposure meter, a two element transistor circuit is connected across a photo-resistor. The transistors possess oppositely conductive characteristics. At a predetermined resistance value of the photo-resistor, which is correlated with the balanced value of the meter, both transistors conduct equally. A pair of indicator lights are in the switching circuit of each transistor and both are on when both transistors conduct at the balanced value. When a deviation from the balanced value occurs in either direction, the transistor, the conductivity of which corresponds to the deviation produces a switching frequency with a unijunction transistor to turn the light on and off at the rate of the switching frequency, while the other light remain unaffected and stays on.

BACKGROUND OF THE INVENTION

Field of the invention

The present invention relates to an electronic exposure meter in which the balancing is performed through the visual observation of two indicator elements.

Prior art

Exposure meters utilizing visual observation for balancing are already known. The known arrangements usually include more or less complicated electronic switching circuits which are controlled by a photo-resistor exposed to the light and which in their output include two lamps which glow with equal light intensity when the balanced condition is attained. The balancing itself is performed through the adjustment of a diaphragm disposed in front of the light entry aperture for the photo-resistor, the vane being also connected to the setting and computing parts of the apparatus. In case of a manual type exposure meter such computing parts may consist of the computing ring itself. In the above-described known exposure meters, the balancing must be performed visually through attaining an equal light intensity of two indicator lights. It is, however, known that such subjective photometric methods lead to inaccurate results. This is more so when the shooting occurs under over-exposed light conditions, such as, at sunshine, when misbalancing becomes practically unavoidable. The known sun-visors or similar auxiliary means under the last-mentioned conditions, afford only very little improvements.

SUMMARY OF THE INVENTION

It is, therefore, an object of the present invention to provide an indicating method and apparatus to perform such method in which the gradual attainment of the balanced condition is determined not by the sole observation of the light intensity of two indicator lights.

It is another object of the invention to provide an indicating apparatus in which the indicating elements posses characteristics which permit an accurate balancing through visual observation.

It is a further object of the invention to provide an indicating method and apparatus which enables the picture taking person to easily recognize the direction and the extent of deviation from the balanced point.

In accordance with the invention an exposure meter is provided in which two indicating elements are present, each of them being adapted to blink at a frequency determined by the extent of the deviation from the balanced condition in a direction with which the respective indicating light is associated, while the other indicating light remains unaffected by the deviation in the opposite direction and will glow at a constant light intensity. Should the deviation be in the reverse direction from the balanced point, then the indicating lights interchange their functions. On the other hand, both indicating lights exhibit constant light intensity at the balanced condition.

The present invention provides more particularly in an exposure meter a voltage divider circuit comprising photo-resistor means, resistor means, a switching circuit including a pair of switching transistors connected across said voltage divider circuit, said switching transistors having opposite conductivity characteristics and being equally conductive at a predetermined resistance value of said photo-resistor means, one of said switching transistors being conductive, the other non-conductive, when the resistance value of said photo-resistor means is below said predetermined value, unijunction transistor means connected to each of said transistors for producing a switching frequency in accordance with the conditions in said switching circuit, and having indicating elements connected into the circuit of each of said unijunction transistors for indicating said switching frequency.

DESCRIPTION OF THE PREFERRED EMBODIMENTS

Figure 1:
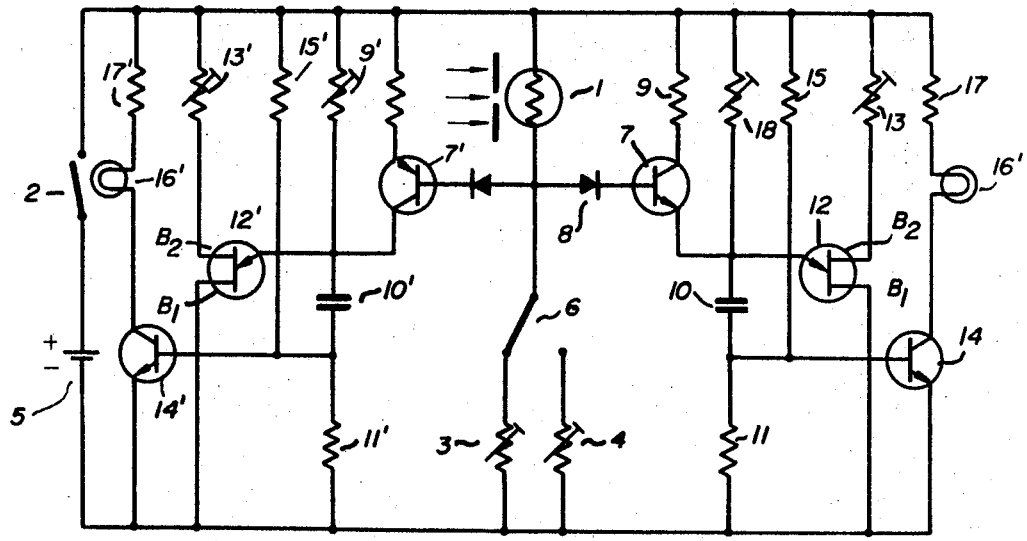
FIG. 1 is a circuit diagram showing the electrical connections in accordance with the invention.

Referring to FIG. 1, there is provided a photo-resistor which is connected to a unidirectional potential source 5 over a switch 2 and through one of the variable calibrating resistors 3 and 4. Resistors 3 and 4 are adapted to be thrown selectively into the circuit through switch 6. It is pointed out that only the circuit connections to the right of photo-resistor 1 will be described in detail, since the circuit connections, accepting the battery and switch 2, are the same to the left of the photo-resistor 1 as the circuit to the right thereof. A transistor 7 is connected with its base through a diode 8 to a conductor which connects photo-resistor 1 with switch 6, while the collector of transistor 7 is connected through a resistor 9 to the positive terminal of battery 5 through switch 2. The emitter of transistor 7 is connected in series with a capacitor 10 and a resistor 11 which connect the emitter in series with the negative terminal of battery 5. A unijunction transistor 12 is connected between the emitter of transistor 7 and capacitor 10. More particularly, base $B_1$ of the unijunction transistor 12 is connected to the negative terminal of battery 5, while base $B_2$ is connected to the positive terminal of battery 5 through a resistor 13 and switch 2. A switching transistor 14 is connected with its base between capacitor 10 and a resistor 11, while biasing of transistor 14 is attained through a resistor 15 connected to the positive terminal of battery 5. The collector circuit of transistor 14 includes an indicator light 16, such as a bulb, and a resistor 17 connected to the positive terminal of battery 5 through switch 2. A further resistor 18 is provided for limiting the lowest blinking frequency and is connected parallel with resistor 9 and transistor 7. As has been pointed out, the left side of the circuit has similar circuit connections as the above described right side of the circuit and contains indicator light 16′ therein, while the remaining circuit elements are similar to those on the right side of the circuit and have been designated by similar reference numerals except primed. Transistor 7′, however, differs from transistor 7 in that it possesses conductivity characteristics inversely related to those of transistor 7. An attenuating element, such as diaphragm 19 can be disposed in front of photo-resistor 1.

The above-described arrangement operates as follows:

The photo-resistor 1 on which the light falls during exposure forms together with one of the variable calibrating resistors 3 or 4, a voltage divider circuit. In accordance with the light conditions falling on photo-resistor 1, the potentials on the bases of transistors 7 and 7′ also vary. Consequently, transistors 7 and 7′ become more or less conductive and in opposite relationship since their conductivity characteristics are inversely related as pointed out above. The arrangement is such, that when a predetermined light intensity falls on photo-resistor 1, and which corresponds to the balanced value, that is, which is the value corresponding to the magnitude assigned to the balance point, both transistors 7 and 7′ are equally conductive. By adjusting attenuator 19 so that more light falls on photo-resistor 1, its resistance value decreases and transistor 7′ becomes less conductive. On the other hand, by decreasing the aperture and thereby increasing the resistance value of the photo-resistor, transistor 7 becomes less conductive. As a result of such conductivity changes, the resistance values of the corresponding emitter-collector paths of the respective transistors and consequently, the load resistance values of the respective capacitors 10 and 10′ will also change.

Should the light intensity falling on photo-resistor 1 become larger than the light intensity associated with the balanced value, then the conductivity of transistor 7′ will decrease and capacitor 10′ will correspondingly charge at a slower rate until the emitter potential of the unijunction transistor 12′ reaches its breakdown value. After attainment of such breakdown voltage, the unijunction transistor 12′ is switched to its conducting state and capacitor 10′ discharges over resistor 11′. Consequently, the emitter potential of unijunction transistor 12′ falls to an extent that the emitter thereof will become cut off again. Now, capacitor 10′ begins to charge again. The just-described process repeats itself continuously. The discharge time of capacitor 10′ under the above described conditions amounts to only fractions of a second while the charging time depends always from the conductivity of transistor 7′ under the particular conditions. In order to attain a favorable on and off relationship of indicator lamps 16′, the switching frequency produced by unijunction transistor 12′ is fed to the bases of the associated switching transistor 14′. The last mentioned switching transistor is conductive during the charging cycle and it is cut off during the discharging cycle. Consequently, the indicator lamp 16′ which is connected into the collector circuit of transistor 14′ will blink at the rate of the switching frequency.

Should now transistor 7′ become more conductive through decreasing the aperture 19 and through the attendant decrease of the light intensity falling on photo-resistor 1, the switching frequency will increase until a predetermined load resistance of transistor 7′ will be just short of its predetermined value. The unijunction transistor 12′ will not switch back anymore, consequently, lamp 16′ will glow with a constant intensity. Under these conditions, the balanced condition is attained.

In exactly similar manner operates the other half of the circuit containing parts 7–18 when the light intensity falling on photo-resistor 1 will be less than the magnitude associated with the balanced condition. In this side of the circuit, the lamp 16 will blink slowly when the magnitude associated with the balanced condition is greatly deviated from, while the blinking frequency increases when the balanced value is approached. Then lamp 16 will glow with constant intensity.

When both lamps 16 and 16′ glow constantly, then the balanced condition has been attained. Now, one may read off directly the light intensity or the time-diaphragm combination from the adjusting or computing means coupled with the attenuator 19.

Figure 2:
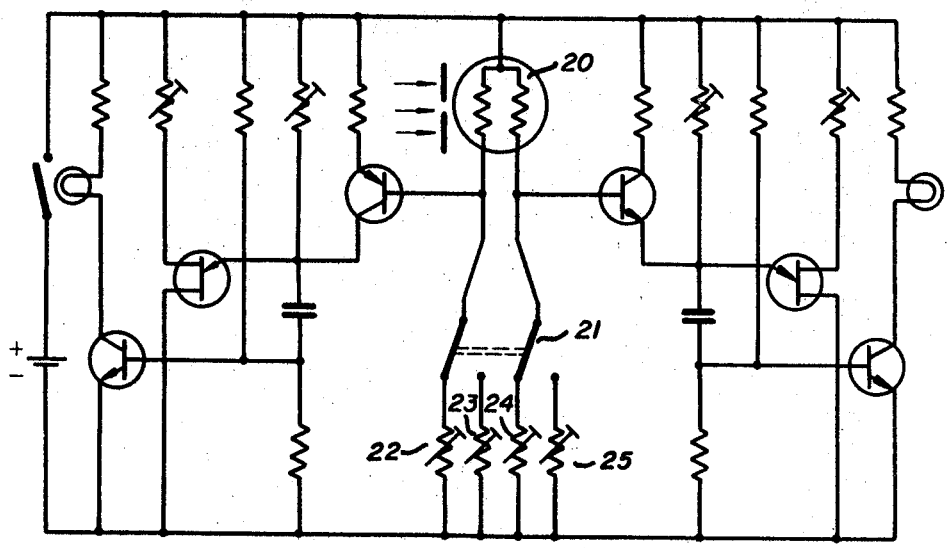
FIG. 2 is a circuit diagram similar to FIG. 1 showing another embodiment of the invention.

FIG. 2 shows another embodiment of the invention in which a dual photo-resistor 20 is used which over switch 21 is connected with a pair of calibrating resistors associated with each switch arm, that is, one arm of switch 21 is associated with calibrating resistors 21, 23 while the other switch arm is associated with calibrating switch arm 24, 25. The remaining portion of the circuit is the same as in FIG. 1, therefore, the reference numerals have been omitted when the parts are similar. With the arrangement of FIG. 2, a feedback free isolation of both switching circuits is attained so that diodes 8 and 8′ appearing in FIG. 1 can be omitted. The circuit of FIG. 2 operates in a similar manner as FIG. 1.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed is:

1. In an exposure meter, a voltage divider circuit comprising photo-resistor means and variable resistor means; a switching circuit including first and second switching transistors connected across said voltage divider circuit, said switching transistors having opposite conductivity characteristics and being equally conductive at a predetermined resistance value of said photo-resistor means, one of said switching transistors being conductive, the other non-conductive, when the resistance value of said photo-resistor means is below said predetermined value; first and second unijunction transistor means connected to respective first and second switching transistors for producing a switching frequency in accordance with the conditions in said switching circuit; and first and second indicating elements connected into respective circuits of each of said unijunction transistors for indicating said switching frequency whereby said first and second indicating elements provide similar non-oscillatory indications when said photo-resistor means has said predetermined resistance value, said first indicating element provides an oscillatory indication when said photo-resistor means has one resistive condition differing from said predetermined value, and said second indicating element provides an oscillatory indication when said photo-resistor means has another resistive condition differing from said predetermined value.

2. The combination as claimed in claim 1, further comprising diode means for connecting each of said first and second switching transistors to said voltage divider circuit, third and fourth switching transistors connected respectively between one of said unijunction transistor means and the associated one of said indicating elements.

3. The combination as claimed in claim 2, further comprising resistor means connected in parallel with each of said switching transistors.

4. The combination as claimed in claim 1, wherein said photo-resistor means comprises first and second photo-resistors, and wherein said variable resistor means comprises first and second variable resistor means; connected to each of said first and second photo-resistors for forming a separate voltage divider circuit for each of said first and second switching transistors.

References Cited

UNITED STATES PATENTS 3,452,656    7/1969    Ruhle et al.
3,460,450    8/1969    Ogihara.

RONALD L. WIBERT, Primary Examiner

W. A. SKLAR, Assistant Examiner

U.S. Cl. X.R.

95—10; 356—226, 227